(12) United States Patent
Persson et al.

(10) Patent No.: US 9,945,075 B2
(45) Date of Patent: Apr. 17, 2018

(54) METHOD OF APPLYING A PHOTOCATALYTIC DISPERSION

(71) Applicant: Välinge Photocatalytic AB, Viken (SE)

(72) Inventors: Hans Persson, Perstorp (SE); Marcus Bergelin, Lerberget (SE); Michael Humle, Vallensbæk Strand (DK); Simon Lausten Östergaard, Copenhagen V (DK)

(73) Assignee: VALINGE PHOTOCATALYTIC AB, Viken (SE)

( * ) Notice: Subject to any disclaimer, the term of this patent is extended or adjusted under 35 U.S.C. 154(b) by 0 days.

(21) Appl. No.: 14/494,957

(22) Filed: Sep. 24, 2014

(65) Prior Publication Data

US 2015/0083319 A1 Mar. 26, 2015

(30) Foreign Application Priority Data

Sep. 25, 2013 (SE) ........................ 1300615

(51) Int. Cl.
| | |
|---|---|
| *D21H 17/00* | (2006.01) |
| *D21H 19/16* | (2006.01) |
| *D21H 17/51* | (2006.01) |
| *D21H 17/68* | (2006.01) |
| *D21H 21/14* | (2006.01) |
| *D21H 21/52* | (2006.01) |

(52) U.S. Cl.
CPC ............. *D21H 17/74* (2013.01); *D21H 17/51* (2013.01); *D21H 17/68* (2013.01); *D21H 19/16* (2013.01); *D21H 21/14* (2013.01); *D21H 21/52* (2013.01)

(58) Field of Classification Search
CPC ....................................................... D21H 7/74

USPC .......................................................... 156/279
See application file for complete search history.

(56) References Cited

U.S. PATENT DOCUMENTS

| | | |
|---|---|---|
| 3,798,111 A | 3/1974 | Lane et al. |
| 3,932,342 A | 1/1976 | Nagata et al. |
| 5,439,514 A | 8/1995 | Kashiwazaki et al. |
| 5,679,138 A | 10/1997 | Bishop et al. |
| 5,714,269 A | 2/1998 | Muñoz Madrid |
| 5,853,830 A | 12/1998 | McCaulley et al. |
| 5,882,246 A | 3/1999 | Inkyo et al. |
| 6,162,842 A | 12/2000 | Freche |

(Continued)

FOREIGN PATENT DOCUMENTS

| | | |
|---|---|---|
| BE | 1015862 A6 | 10/2005 |
| BE | 1017168 A5 | 3/2008 |

(Continued)

OTHER PUBLICATIONS

U.S. Appl. No. 14/386,063, Humle, et al.

(Continued)

*Primary Examiner* — Daniel H Lee
(74) *Attorney, Agent, or Firm* — Buchanan Ingersoll & Rooney P.C.

(57) ABSTRACT

A method of applying a photocatalytic dispersion (10) on a paper (2), including impregnating a paper (2) with a thermosetting resin, drying the resin impregnated paper (2), applying a photocatalytic dispersion (10) comprising photocatalytic nanoparticles on the dried, resin impregnated paper (2), and drying the resin impregnated paper (2) having the photocatalytic dispersion applied thereon. Also, to such a photocatalytic dispersion.

17 Claims, 5 Drawing Sheets

(56) References Cited

U.S. PATENT DOCUMENTS

| | | |
|---|---|---|
| 6,165,619 A | 12/2000 | Ikenaga |
| 6,228,480 B1 | 5/2001 | Kimura et al. |
| 6,284,314 B1 | 9/2001 | Kato et al. |
| 6,299,981 B1 | 10/2001 | Azzopardi et al. |
| 6,409,821 B1 | 6/2002 | Cassar et al. |
| 6,436,159 B1 | 8/2002 | Safta et al. |
| 6,666,913 B2 | 12/2003 | Hirano et al. |
| 6,740,312 B2 | 5/2004 | Chopin et al. |
| 6,835,421 B1 | 12/2004 | Döhring |
| 8,568,870 B2 | 10/2013 | Imai et al. |
| 8,652,646 B2 | 2/2014 | Heukelbach et al. |
| 9,375,750 B2 | 6/2016 | Reenberg et al. |
| 9,573,126 B2 | 2/2017 | Humle et al. |
| 2002/0005145 A1 | 1/2002 | Sherman |
| 2002/0006425 A1 | 1/2002 | Takaoka et al. |
| 2002/0042343 A1 | 4/2002 | Akui et al. |
| 2002/0108640 A1 | 8/2002 | Barger et al. |
| 2003/0162658 A1 | 8/2003 | Domen et al. |
| 2003/0236317 A1 | 12/2003 | Sakatani et al. |
| 2004/0067703 A1 | 4/2004 | Grunden et al. |
| 2004/0081818 A1 | 4/2004 | Baumann et al. |
| 2004/0197682 A1 | 10/2004 | Sonehara et al. |
| 2004/0251329 A1 | 12/2004 | Hsu et al. |
| 2004/0253172 A1 | 12/2004 | Jung et al. |
| 2005/0069706 A1 | 3/2005 | Kessell |
| 2005/0145939 A1 | 7/2005 | Okada et al. |
| 2005/0191505 A1 | 9/2005 | Akarsu et al. |
| 2005/0233893 A1 | 10/2005 | Sakatani et al. |
| 2006/0003013 A1 | 1/2006 | Dobbs |
| 2006/0014050 A1 | 1/2006 | Gueneau et al. |
| 2007/0140951 A1 | 6/2007 | O'Brien |
| 2007/0272382 A1 | 11/2007 | Becker et al. |
| 2008/0032120 A1 | 2/2008 | Braun |
| 2008/0044483 A1 | 2/2008 | Kessell |
| 2008/0260626 A1 | 10/2008 | Bloss et al. |
| 2009/0025508 A1 | 1/2009 | Liao et al. |
| 2009/0075093 A1 | 3/2009 | Iversen et al. |
| 2009/0098305 A1 | 4/2009 | Cheng et al. |
| 2009/0136861 A1 | 5/2009 | Mitsumori et al. |
| 2009/0142604 A1 | 6/2009 | Imai et al. |
| 2009/0180976 A1 | 7/2009 | Seeney et al. |
| 2009/0191273 A1 | 7/2009 | Kessell et al. |
| 2009/0208646 A1 | 8/2009 | Kreuder et al. |
| 2009/0286068 A1 | 11/2009 | Niguma et al. |
| 2009/0317624 A1 | 12/2009 | Yoshioka et al. |
| 2010/0031450 A1 | 2/2010 | Wattebled et al. |
| 2010/0058954 A1 | 3/2010 | Kisch |
| 2010/0112359 A1 | 5/2010 | Sharma et al. |
| 2010/0113254 A1 | 5/2010 | Sato et al. |
| 2010/0203308 A1 | 8/2010 | Mennig et al. |
| 2010/0297434 A1 | 11/2010 | Iversen et al. |
| 2011/0027485 A1 | 2/2011 | Kahn et al. |
| 2011/0083726 A1* | 4/2011 | Takayanagi .......... H01L 31/048 136/251 |
| 2011/0095242 A1 | 4/2011 | Jin et al. |
| 2011/0123814 A1 | 5/2011 | Heukelbach et al. |
| 2011/0136660 A1 | 6/2011 | Hiroshi et al. |
| 2011/0136928 A1 | 6/2011 | Dipietro et al. |
| 2011/0189471 A1 | 8/2011 | Ziegler et al. |
| 2012/0064787 A1 | 3/2012 | Brummerstedt Iversen et al. |
| 2013/0011684 A1 | 1/2013 | Jensen et al. |
| 2013/0177504 A1 | 7/2013 | Macoviak |
| 2013/0216458 A1 | 8/2013 | Nagae et al. |
| 2014/0178694 A1 | 6/2014 | Reenberg et al. |
| 2015/0102258 A1 | 4/2015 | Humle et al. |
| 2015/0343486 A1 | 12/2015 | Jensen et al. |
| 2016/0075606 A1 | 3/2016 | Jensen et al. |

FOREIGN PATENT DOCUMENTS

| | | | |
|---|---|---|---|
| CN | 1445312 A | 10/2003 | |
| CN | 1662465 A | 8/2005 | |
| DE | 10 2004 032 058 A1 | 5/2005 | |
| DE | 10 2007 054 848 A1 | 5/2009 | |
| EP | 0 684 507 A2 | 11/1995 | |
| EP | 0 684 507 A3 | 11/1995 | |
| EP | 0 913 447 A1 | 5/1999 | |
| EP | 0 684 507 B1 | 9/1999 | |
| EP | 0 947 469 A2 | 10/1999 | |
| EP | 1 371 693 A2 | 12/2003 | |
| EP | 1 541 231 A1 | 6/2005 | |
| EP | 1 541 638 A1 | 6/2005 | |
| EP | 1 577 009 A1 | 9/2005 | |
| EP | 1 760 116 A1 | 3/2007 | |
| EP | 1 997 860 A1 | 12/2008 | |
| FR | 2 789 591 A1 | 8/2000 | |
| JP | H10-235201 A | 9/1998 | |
| JP | 2001-038858 A | 2/2001 | |
| JP | 2001-131768 A | 5/2001 | |
| JP | 2002-011827 A | 1/2002 | |
| JP | 2002-146283 A | 5/2002 | |
| JP | 2002-177792 A | 6/2002 | |
| JP | 2002-249705 A | 9/2002 | |
| JP | 2003-071967 A | 3/2003 | |
| JP | 2003-211576 A | 7/2003 | |
| JP | 2005-281017 A | 10/2005 | |
| JP | 2007-167718 A | 7/2007 | |
| JP | 2007-176753 A | 7/2007 | |
| JP | 2008-261093 A | 10/2008 | |
| JP | 2010-047016 A | 3/2010 | |
| JP | 2011-500896 A | 1/2011 | |
| WO | WO 96/39251 A1 | 12/1996 | |
| WO | WO 97/00134 A | 1/1997 | |
| WO | WO 97/30130 A1 | 8/1997 | |
| WO | WO 98/23549 A1 | 6/1998 | |
| WO | WO 98/25711 A1 | 6/1998 | |
| WO | WO 00/44984 A1 | 8/2000 | |
| WO | WO 02/08518 A1 | 1/2002 | |
| WO | WO 02/064266 A2 | 8/2002 | |
| WO | WO 03/016219 A1 | 2/2003 | |
| WO | WO 03/087002 A1 | 10/2003 | |
| WO | WO 2004/005577 A2 | 1/2004 | |
| WO | WO 2004/069400 A1 | 8/2004 | |
| WO | WO 2005/045131 A1 | 5/2005 | |
| WO | WO 2005/066286 A1 | 7/2005 | |
| WO | WO 2005/068181 A1 | 7/2005 | |
| WO | WO 2005/116361 A1 | 12/2005 | |
| WO | WO 2006/136931 A1 | 12/2006 | |
| WO | WO 2007/015669 A2 | 2/2007 | |
| WO | WO 2007/015669 A3 | 2/2007 | |
| WO | WO 2007/069596 A | 6/2007 | |
| WO | WO 2007/072008 A2 | 6/2007 | |
| WO | WO 2007/097284 A1 | 8/2007 | |
| WO | WO 2007/135987 A1 | 11/2007 | |
| WO | WO 2007/144718 A2 | 12/2007 | |
| WO | WO 2007/144718 A3 | 12/2007 | |
| WO | WO 2008/040730 A1 | 4/2008 | |
| WO | WO 2008/117655 A1 | 10/2008 | |
| WO | WO 2008/128818 A1 | 10/2008 | |
| WO | WO 2009/021524 A1 | 2/2009 | |
| WO | WO 2009/024285 A1 | 2/2009 | |
| WO | WO 2009/049000 A1 | 4/2009 | |
| WO | WO 2009/062516 A2 | 5/2009 | |
| WO | WO 2009/062516 A3 | 5/2009 | |
| WO | WO 2009/065769 A2 | 5/2009 | |
| WO | WO 2009/065769 A3 | 5/2009 | |
| WO | WO 2009062516 A2 * | 5/2009 | ........... C09D 7/1216 |
| WO | WO 2009/124704 A1 | 10/2009 | |
| WO | WO 2009/145209 A1 | 12/2009 | |
| WO | WO 2009/157449 A1 | 12/2009 | |
| WO | WO 2010/001669 A1 | 1/2010 | |
| WO | WO 2010/037866 A1 | 4/2010 | |
| WO | WO 2010/110726 A1 | 9/2010 | |
| WO | WO 2011/075837 A1 | 6/2011 | |
| WO | WO 2011/093785 A1 | 8/2011 | |
| WO | WO 2011093785 A1 * | 8/2011 | ........... D21H 17/67 |
| WO | WO 2012/014893 A1 | 2/2012 | |

(56) References Cited

FOREIGN PATENT DOCUMENTS

| WO | WO 2013/006125 A1 | 1/2013 |
|----|-------------------|--------|
| WO | WO 2013/141789 A1 | 9/2013 |

OTHER PUBLICATIONS

Inkyo, Mitsugi, et al., "Beads Mill-Assisted Sythesis of Poly Methyl Methacrylate (PMMA)-TiO$_2$ Nanoparticle Composites," *Ind. Eng. Chem. Res.*, 2008, pp. 2597-2604, vol. 47, No. 8, American Chemical Society, USA (published on the web Mar. 14, 2008).

Inkyo, Mitsugi, et al., "Experimental investigation of nanoparticle dispersion by beads milling with centrifugal bead separation," *Journal of Colloid and Interface Science*, 2006, pp. 535-540, vol. 304, Elsevier Inc., USA.

Joni, I Made, et al., "Dispersion Stability Enhancement of Titania Nanoparticles in Organic Solvent Using a Bead Mill Process," *Ind. Eng. Chem. Res.*, 2009, pp. 6916-6922, vol. 48, No. 15, American Chemical Society, USA (published on the web Jul. 13, 2009).

Takeda, Masayoshi, et al., "High-concentration Transparent TiO$_2$ Nanocomposite Films Prepared from TiO$_2$ Nanoslurry Dispersed by Using Bead Mill," *Polymer Journal*, 2008, pp. 694-699, vol. 40, No. 8, The Society of Polymer Science, JP.

Takeda, Masayoshi, et al., "Preparation of Nanocomposite Microspheres Containing High Concentration of TiO$_2$ Nanoparticles via Bead Mill Dispersion in Organic Solvent," *Chemistry Letters*, 2009, pp. 448-449, vol. 38, No. 5, The Chemical Society of Japan, JP.

Thompson, Tracy L., et al., "Surface Science Studies of the Photoactivation of TiO$_2$-New Photochemical Processes," *Chem. Rev.*, 2006, pp. 4428-4453, vol. 106, No. 10, American Chemical Society, USA (published on the web Oct. 11, 2006).

Uzunova-Bujnova, M., et al., "Effect of the mechanoactivation on the structcure, sorption and photocatalytic properties of titanium dioxide,"*Materials Chemistry and Physics*, 2008, pp. 291-298, vol. 110, Elsevier B.V., The Netherlands.

Parker, John, "Next-generation abrasive particles for CMP", Solid Technology, Dec. 2004, pp. 30-31.

Jensen, Henrik, et al, "Characterization of nanosized partly crystalline photocatalysts", Journal of Nanoparticle Research 6, 2004, pp. 519-526.

"Information Sheet—Cleaning and maintenance of laminate flooring in commercial areas created on behalf of the EPLF," Sep. 22, 1999, 5 pages, European Producers of Laminate Flooring, Bielefeld, DE.

Mills, A., et al., "An intelligence ink for photocatalytic films," *Chem. Commun.*, published as an Advance Article on the web Apr. 14, 2005, pp. 2721-2723, The Royal Society of Chemistry, www.rsc.org.chemcomm.

Nussbaumer, Renè J., et al., "Synthesis and characterization of surface-modified rutile nanoparticles and transparent polymer composites thereof," *Journal of Nanoparticle Research*, Aug. 1, 2002, pp. 39-323, vol. 4, No. 4, Kluwer Academic Publishers, NL.

"Transparent Pigments," *Kirk-Othmer Encyclopedia of Chemical Technology, Fourth Edition*, 1996, vol. 19, pp. 36-37, John Wiley & Sons, Inc., NY, U.S.

Jang, Hee Dong, et al., "Effect of particle size and phase composition of titanium dioxide nanoparticles on the photocatalytic properties," Journal of Nanoparticle Research, Jan. 1, 2001, pp. 141-147, vol. 3, Kluwer Academic Publishers, NL.

Caseri, Walter, "Nanocomposites of polymers and metals or semiconductors: Historical background and optical properties," Macromol. Rapid Commun., Jan. 1, 2000, pp. 705-722, vol. 21, No. 11, Wiley-VCH Verlag GmbH, Weinheim, DE.

Mandzy, N., et al., "Breakage of TiO$_2$ agglomerates in electrostatically stabilized aqueous dispersions," Powder Technology, Dec. 6, 2005, pp. 121-126, vol. 160, No. 2, Elsevier Sequoia, Lausanne, CH.

Wu, Shu-Xin, et al., "XPS Study of Copper Doping TiO2 Photocatalyst," Acta. Phys. -Chim. Sin., Oct. 2003, pp. 967-969, vol. 19(10), CN.

**Humle, Michael, et al., U.S. Appl. No. 14/386,063, entitled "A Photocatalytic Composition," filed in the U.S. Patent and Trademark Office on Sep. 18, 2014.

Arin, Melis, et al., "Inkjet printing of photocatalytically active TiO$_2$ thin films from water based precursor solutions," 28 pages; also found in *Journal of the European Ceramic Society*, Jun. 2011, pp. 1067-1074, vol. 31, Issue 6, Science Direct, Elsevier B.V. (Acc Dec. 21, 2010).

Kim, Seong-Jim, et al., "Aqueous TiO$_2$ suspension preparation and novel application of ink-jet printing technique for ceramics patterning," *Journal of Materials Science Letters*, 1998, pp. 141-144, vol. 17, Chapman & Hall, London, England.

Kuscer, Danjela, et al., "Formulation of an Aqueous Titania Suspension and its Patterning with Ink-Jet Printing Technology," *J Am Ceram Soc.*, 2012, pp. 487-493, vol. 95, No. 2, Blackwell Publishing Inc on behalf of The American Ceramic Society, USA.

Raimondo, Mariarosa, et al., Photocatalytic Ceramic Tiles: Key Factors in Industrial Scale-Up (And the Open Question of Performance), Qualicer 2012, pp. 1-14, Castellón, Spain.

Schmidt, Helmut K., et al., "Application of spray techniques for new photocatalytic gradient coatings on plastics," *Thin solid films*, Apr. 28, 2006, vol. 502, Issues 1-2, pp. 132-137, Elsevier B.V., NL.

Thilagan Palaniandy, Samayamutthirian, "A Study on Ultra Fine Grinding of Silica and Talc in Opposed Fluidized Bed Jet Mill," PhD Thesis, 2008, 48 pages, Universiti Sains Malaysia, http://eprints.usm.my/view/creators/Thilagan_Palaniandy=3ASamayamutthirian=3A=3A.html.

International Search Report issued in PCT/SE2014/051096, dated Jan. 26, 2015, ISA/SE, Patent-och registreringsverket, Stockholm, SE, 6 pages.

U.S. Appl. No. 15/394,874, Ziegler, et al.

Ziegler, Göran, et al., U.S. Appl. No. 15/394,874 entitled "Method for Applying Nanoparticles," filed in the U.S. Patent and Trademark Office on Dec. 30, 2016.

Fumed Silica definition, *Hawley's Condensed Chemical Dictionary*, 1121, (2007), Wiley Online Library, 2 pages.

Extended European Search Report issued in EP Application No. 14 848 214.4, Mar. 13, 2017, European Patent Office, Munich, DE, 6 pages.

* cited by examiner

METHOD OF APPLYING A PHOTOCATALYTIC DISPERSION

CROSS REFERENCE TO RELATED APPLICATIONS

The present application claims the benefit of Swedish Application No. SE 1300615-0 filed on 25 Sep. 2013. The entire contents of SE 1300615-0 are hereby incorporated herein by reference in their entirety.

TECHNICAL FIELD

The disclosure relates to a method of applying a photocatalytic dispersion on a paper, and such a photocatalytic dispersion.

TECHNICAL BACKGROUND

Photocatalytic materials such as $TiO_2$ are used in many applications to obtain self-cleaning and air cleaning properties. The largest obstacle with photocatalytic materials is the scaling up to make large industrial productions, for example how to apply the photocatalytic material to the substrate in an economic way and in a way that is possible to integrate into the existing production process.

The process of impregnating papers such as décor papers and overlay papers with a resin is a well-known process. These papers are adapted to form a laminate surface of, for example, building panels such as floor panels, wall panels, ceiling panels, furniture components etc.

WO 2009/062516 describes a method of impregnating an unimpregnated paper with an impregnation fluid comprising photocatalytic nanoparticles, and thereafter impregnating the paper with a polymer resin. This document also discloses a method of impregnating the paper with a polymer resin composition comprising nanoparticles in one step. However, such methods have been proven difficult to include in existing impregnating lines. It has also been proven difficult to avoid problems with photogreying when impregnating with a polymer resin composition comprising nanoparticles in one step.

WO 2011/093785 describes a method wherein photocatalytic nanoparticles are applied as a spray coating on a sheet freshly impregnated with a resin in an uncured and wet state. Such methods have been proven difficult to include in existing impregnating lines.

Furthermore, materials and coatings with lasting performances, which are preserved over time, have been lacking. One drawback of using photocatalytic active $TiO_2$ in, for example, building materials, has been the lack of colour fastness and the change of colour upon light exposure. In the paper and the laminate industry $TiO_2$ is an often-used pigment but special grades of $TiO_2$ with no or reduced photocatalytic activity are needed as photocatalytic $TiO_2$ photogrey when exposed to light. Photogreying is an important quality property of pigment $TiO_2$ used in the décor and paper industry and photogreying is of great practical importance because it can affect the colour of products such as paints, polymers, and cosmetics.

Photogreying is showing as the colour of $TiO_2$ changes from white to dark violet upon light exposure. It has been suggested that photogreying is caused by reduction of $TiO_2$ (probably from $Ti^{4+}$ to $Ti^{3+}$) during light irradiation in the absence of oxygen.

Figure 1:
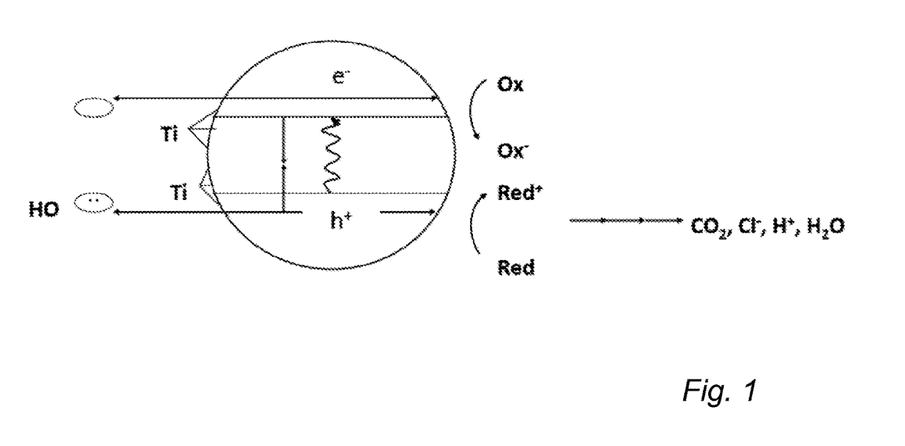
FIG. 1 shows a photocatalytic process of titanium dioxide.

The process of photogreying can be explained by examining the photocatalytic properties of $TiO_2$, which is shown in FIG. 1. When $TiO_2$ is irradiated with light with a wavelength shorter than the band gap the absorbed photon can generate an electron/hole pair. Normally the electron travels in the conduction band to the surface where a reduction occurs. In most cases oxygen is reduced by the electron. In low oxygen environment, for example in a melamine formaldehyde resin matrix, or another types of amino resins, the electron cannot be taken by oxygen and travels to the Ti-centre and creates a $Ti^{3+}$ centre. $Ti^{3+}$ centres are purple/blue and create a blue toning of the product. This mechanism is known as photogreying. In, for example, laminates the high degree of polymerization and density of melamine formaldehyde resin makes the diffusion of oxygen and moisture from the surrounding environment very slow and the oxidization of grey $Ti^{3+}$ ions to the white $Ti^{4+}$ ions becomes slow. However, the photo reduction of $Ti^{4+}$ to $Ti^{3+}$ is fast and thereby the laminate boards and panels become grey. Another important aspect with laminate boards and panels are the release of formaldehyde during curing. Formaldehyde is known to be a strong reducing agent and formaldehyde in the matrix can lower the overall partial pressure of oxygen and enhance photogreying. When the laminate boards and panels are stored in dark the photocatalytic reduction step is inhibited and within several days, up to weeks, the slow oxidation step turns the panels back to the original colour.

The photogreying process is reversible and oxygen is known to reverse the photogreying process but the change from dark violet colour to the original colour is much slower than the reverse reaction.

Within paper, overlay paper, décor paper, laminate flooring, laminate panels, foil and film industry photogreying is an important practical problem as the presence of cellulose and melamine formaldehyde resin enhances the photogreying of $TiO_2$. Formaldehyde has been shown to enhance photogreying. For example, in a melamine formaldehyde resin matrix in a laminate floor, the dark violet $Ti^{3+}$ ions created by light exposure are relative stable as the partial pressure of oxygen is very low. The increasing $Ti^{3+}$ concentration in the system results in greying of the product. Therefore, $TiO_2$ grades for paper and laminates are surface modified as to be able to eliminate the greying. The $TiO_2$ grades for laminates are surface coated to inhibit the photocatalytic cycle and thereby suppress photogreying of the products.

Various methods and techniques have been developed to overcome photogreying of $TiO_2$ pigmented products. Common for all of these techniques are that photogreying is eliminated by inhibiting the photocatalytic process, and thereby inactivating the photocatalytic properties of $TiO_2$.

SUMMARY

It is an object of at least embodiments of the disclosure to provide an improvement over the above described techniques and known art.

A further object of at least embodiments of the disclosure is to provide a method of applying a photocatalytic dispersion, which can be, integrated into existing impregnation processes.

A further object of at least embodiments of the disclosure is to provide a method of applying a photocatalytic dispersion, which also gives scratch resistance.

A further object of at least embodiments of the disclosure is to reduce photogreying.

A further object of at least embodiments of the disclosure is to provide an improved photocatalytic dispersion.

At least some of these and other objects and advantages that will be apparent from the description have been achieved by a method of applying a photocatalytic dispersion on a paper, comprising impregnating a paper with a thermosetting resin,
drying the resin impregnated paper,
applying a photocatalytic dispersion comprising photocatalytic nanoparticles on the dried, resin impregnated paper, and
drying the resin impregnated paper having the photocatalytic dispersion applied thereon.

In an embodiment, the photocatalytic dispersion further comprises an anti-photogreying additive.

An advantage of embodiments of the disclosure is that the photocatalytic dispersion can be applied inline in a conventional impregnation process. Application of the photocatalytic dispersion can be integrated into an existing impregnation line. Especially, the application of the photocatalytic dispersion can be integrated into an existing impregnation line without large reconstruction or redesign of the impregnation line. By the method, a resin impregnated paper having a photocatalytic dispersion applied thereon may be obtained inline in the impregnation process.

Alternatively, the photocatalytic dispersion can be applied offline from the conventional impregnation process, such that no reconstruction or redesign of the impregnation line is required. The paper is impregnated and dried in a conventional impregnation line, thereafter the photocatalytic dispersion is applied in a separate process step, before any pressing operation occurs.

Further, by applying the photocatalytic dispersion separately from the thermosetting resin, the photocatalytic particles can be applied at the surface of the paper and not incorporated in the resin. Thereby, the amount of the photocatalytic dispersion applied can also be reduced, since the photocatalytic particles are applied there they have a photocatalytic effect, e.g., at the surface of the paper.

Further, application of the photocatalytic dispersion can be combined with application of other particles such as scratch resistant and/or wear resistant particles in a conventional impregnation process. Application of the photocatalytic dispersion does not necessarily replace other steps of a conventional impregnation process, on the contrary, steps such as application of scratch resistant particles can be combined with application of the photocatalytic dispersion such that improved functionality can be achieved.

The photocatalytic dispersion may further comprise an anti-photogreying additive such as a surfactant. The surfactant reduces photogreying caused by the photocatalytic particles in an environment including melamine formaldehyde resin while maintaining the photocatalytic activity. The surfactant is applied in an amount higher than recommended when used as a wetting agent.

The anti-photogreying additive may be a surfactant. The surfactant may be a non-ionic surfactant. The surfactant may be a silicone surfactant, preferably a non-ionic silicone surfactant. More preferably, the surfactant may be a polyether modified siloxanes. More preferably, the surfactant may be a polyether modified polysiloxanes. More preferably, the surfactant may be a polyether modified polymethyl siloxane. As an alternative, the surfactant may be polydimethylsiloxane co-polymer.

The anti-photogreying additive such as a surfactant may be present in the photocatalytic dispersion in a concentration higher than 0.1 wt. %, preferably higher than 1 wt. %, more preferably higher than 5 wt. %. The anti-photogreying additive such as a surfactant may be present in the photocatalytic dispersion in a range of 1-35 wt. %, preferably 1-15 wt. %, more preferably 1-5 wt. %.

By including an anti-photogreying additive such as a surfactant in such concentrations, photogreying may be reduced, while the photocatalytic activity may be maintained at the same level or at least maintained to a level of at least 90% of the level that is achieved without the photogreying addition.

The step of drying the resin impregnated paper may comprise drying said paper to a loss on cure of less than 20%, preferably less than 15%.

By "loss on cure" is meant the weight loss, calculated as weight percentage of the original weight, occurring when heating the impregnated paper at 160° C. for 5 minutes. The weight loss corresponds to moisture released from the impregnated paper. Under these conditions the released moisture is of two parts. The first part is the free moisture formed from water and/or other substances having a boiling point below 160° C. being trapped in the powder and the second part origins from the cross linking of the binder. Melamine formaldehyde resin cures during the heating up to 160° C. and the resin cross-links via a condensation reaction, i.e., water is released by the condensation reaction.

The photocatalytic dispersion may further comprise scratch resistant particles. By "scratch resistant particles" are meant particles improving the scratch or scuff resistant properties of the paper. By including both photocatalytic nanoparticles and scratch resistant particles in the dispersion, both photocatalytic properties and scratch resistant properties can be obtained in one coating step, giving the paper improved functionality.

The scratch resistant particles may be or comprise nano-sized silica particles, preferably fused silica particles. Nano-sized silica particles provide improved scratch resistance to the paper.

The scratch resistant particles may be disc shaped particles, preferably having a width/thickness ratio being equal or exceeding 3:1, more preferably being equal or exceeding 5:1. Such disc-shaped particles orientate along the surface of the paper, thereby improving the scratch resistance of the paper.

The scratch resistant particles may be or comprise aluminium oxide.

The photocatalytic nanoparticles may be photocatalytic titanium dioxide, preferably in anatase form.

The photocatalytic nanoparticles may have a primary particle size of less than 50 nm, preferably less than 30 nm, more preferably less than 20 nm, most preferably less than 10 nm.

The photocatalytic nanoparticles may have a crystallinity of at least 60%, preferably at least 70%, more preferably at least 80%, most preferably at least 90%.

The photocatalytic dispersion may be waterborne.

The photocatalytic dispersion may be applied by at least one roller or by spraying.

The paper may be a continuous paper web.

According to a second aspect of the disclosure, a method of applying a photocatalytic dispersion on a paper is provided. The method comprises providing a dried, thermosetting impregnated paper, applying a photocatalytic dispersion comprising photocatalytic nanoparticles on the dried, resin impregnated paper, and drying the resin impregnated paper having the photocatalytic dispersion applied thereon.

According to a third aspect of the disclosure, a photocatalytic dispersion is provided. The photocatalytic dispersion comprises photocatalytic nanoparticles being dispersed in a continuous phase, scratch resistant particles, and an anti-photogreying additive, preferably a surfactant, being present in the photocatalytic dispersion in a concentration exceeding 1 wt. %, preferably exceeding 5 wt. % and, for example, in a range of 1-35 wt. %.

An advantage of embodiments of the second aspect is that a photocatalytic dispersion is provided, having both photocatalytic properties and scratch resistant properties. Furthermore, the photocatalytic dispersion reduces photogreying caused by the photocatalytic particles in an environment including melamine formaldehyde resin while maintaining the photocatalytic activity.

The photocatalytic nanoparticles may be photocatalytic titanium dioxide particles, preferably in anatase form.

The photocatalytic dispersion may be waterborne.

The anti-photogreying additive such as surfactant may be present in the photocatalytic dispersion in a range of 1-35 wt. %, preferably 1-15 wt. %, more preferably 1-5 wt. %.

The scratch resistant particles may be or comprise nanosized silica particles, preferably fused silica particles.

The scratch resistant particles may be or comprise disc shaped particles, preferably having a width/thickness ratio exceeding 3:1, more preferably exceeding 5:1.

The scratch resistant particles may be or comprise aluminium oxide.

An ratio between the amount of photocatalytic nanoparticles and the amount of scratch resistant particles such as nanosized silica may be 1:4, such as 1:3, such as 1:2 such as 1:1, in the photocatalytic dispersion.

According to fourth aspect of the disclosure, a method of manufacturing a panel is provided. The method comprises impregnating a paper with a thermosetting resin, drying the resin impregnated paper, applying a photocatalytic dispersion comprising photocatalytic nanoparticles on the dried, resin impregnated paper, drying the resin impregnated paper having the photocatalytic dispersion applied thereon, applying the dried resin impregnated paper having the photocatalytic dispersion applied thereon on a substrate, and applying heat and pressure to cure the thermosetting resin and adhere the paper to the substrate. The third aspect may incorporate all the advantages of the first aspect, which previously has been discussed, whereby the previous discussion is applicable also for the third aspect.

According to a fifth aspect of the disclosure, a method of manufacturing a panel is provided. The method comprises providing a dried, thermosetting resin impregnated paper, applying said paper on a substrate, applying a photocatalytic dispersion comprising photocatalytic nanoparticles on said paper, and applying heat and pressure to cure the thermosetting resin and adhere said paper to the substrate.

The photocatalytic dispersion may be applied to the dried, resin impregnated paper both before or after the dried, resin impregnated paper has been applied on the substrate.

The step of applying heat and pressure may be subsequent to the step of applying the photocatalytic dispersion on the dried, resin impregnated paper.

In an embodiment, the method comprises drying said paper having the photocatalytic dispersion applied thereon prior to applying heat and pressure to cure the thermosetting resin and adhere the paper to the substrate.

In an embodiment, the photocatalytic dispersion comprises an anti-photogreying additive, preferably a surfactant.

This aspect of the disclosure allows the photocatalytic dispersion to be applied to the dried, resin impregnated paper in connection with pressing the panel, i.e., separate from the impregnation process. The paper has been impregnated with a thermosetting resin and thereafter dried in a conventional impregnation process, which may be separate from pressing step.

Further, by applying the photocatalytic dispersion separately from the thermosetting resin, the photocatalytic particles can be applied at the surface of the paper and not incorporated in the resin. Thereby, the amount of the photocatalytic dispersion applied can also be reduced, since the photocatalytic particles are applied there they have a photocatalytic effect, e.g., at the surface of the paper.

The photocatalytic dispersion may further comprise an anti-photogreying additive such as a surfactant. The surfactant reduces photogreying caused by the photocatalytic particles in an environment including melamine formaldehyde resin while maintaining the photocatalytic activity. The surfactant is applied in an amount higher than recommended when used as, for example, a wetting agent.

The anti-photogreying additive may be a surfactant. The surfactant may be a non-ionic surfactant. The surfactant may be a silicone surfactant, preferably a non-ionic silicone surfactant. More preferably, the surfactant may be a polyether modified siloxanes. More preferably, the surfactant may be a polyether modified polysiloxanes. More preferably, the surfactant may be a polyether modified polymethyl siloxane. As an alternative, the surfactant may be polydimethylsiloxane co-polymer.

The anti-photogreying additive such as a surfactant may be present in the photocatalytic dispersion in a concentration higher than 0.1 wt. %, preferably higher than 1 wt. %, more preferably higher than 5 wt. %. The anti-photogreying additive such as a surfactant may be present in the photocatalytic dispersion in a range of 1-35 wt. %, preferably 1-15 wt. %, more preferably 1-5 wt. %. By including a surfactant in such concentrations, photogreying may be reduced, while the photocatalytic activity may be maintained at the same level or at least maintained to a level of at least 90% of the level that is achieved without the photogreying addition.

The dried resin impregnated paper may have a loss on cure of less than 20%, preferably less than 15%, more preferably less than 10% such as in the range of 5-9%.

The photocatalytic nanoparticles may be photocatalytic titanium dioxide, preferably in anatase form.

The photocatalytic nanoparticles may have a primary particle size of less than 50 nm, preferably less than 30 nm, more preferably less than 20 nm, most preferably less than 10 nm.

The photocatalytic nanoparticles may have a crystallinity of at least 60%, preferably at least 70%, more preferably at least 80%, most preferably at least 90%.

The photocatalytic dispersion may be waterborne.

The photocatalytic dispersion may be applied by spraying.

The substrate may be a wood based board such as MDF, HDF, particleboard, plywood, OSB, WPC (Wood Plastic Composite), etc.

The scratch resistant particles may be or comprise nanosized silica particles, preferably fused silica particles.

The scratch resistant particles may be or comprise disc shaped particles, preferably having a width/thickness ratio exceeding 3:1, more preferably exceeding 5:1.

The scratch resistant particles may be or comprise aluminium oxide.

An ratio between the amount of photocatalytic nanoparticles and the amount of scratch resistant particles such as nanosized silica may be 1:4, such as 1:3, such as 1:2 such as 1:1, in the photocatalytic dispersion.

BRIEF DESCRIPTION OF THE DRAWINGS

The disclosure will by way of example be described in more detail with reference to the appended schematic drawings, which show embodiments of the disclosure.

DETAILED DESCRIPTION

Figure 2:
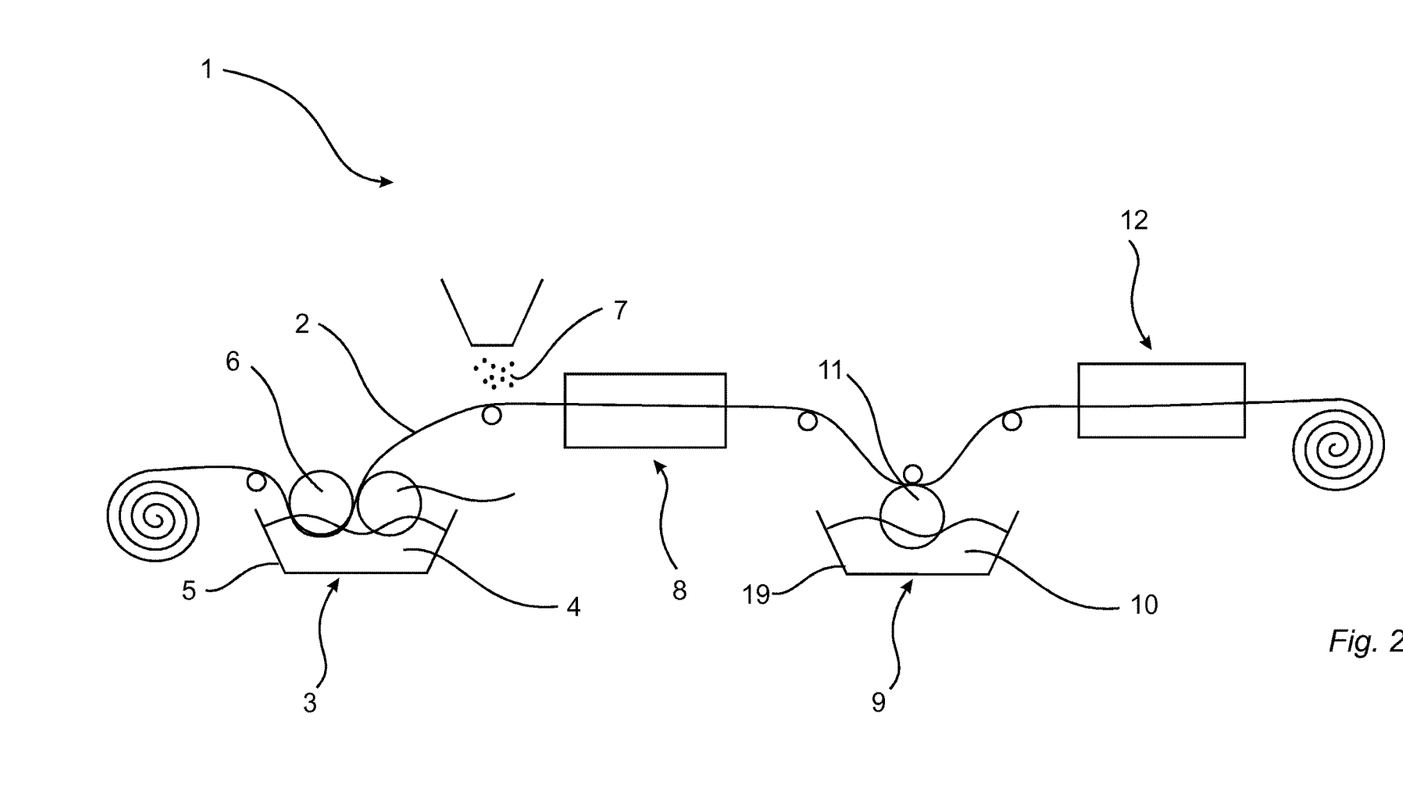
FIG. 2 shows an embodiment of a method of applying a photocatalytic dispersion.

A method of applying a photocatalytic dispersion will now be described with reference to FIG. 2. FIG. 2 shows an impregnating line 1 for impregnating a paper 2 with a thermosetting resin. The paper is preferably a continuous paper web. The paper comprises preferably cellulosic material.

In a first step, the paper 2 is impregnated with a thermosetting resin 4 in an impregnation station 3. The thermosetting resin 4 is preferably an amino resin such as melamine formaldehyde resin, phenol formaldehyde resin, urea formaldehyde resin, or a combination thereof. Preferably, the resin is melamine formaldehyde resin.

The paper 2 is impregnated with the thermosetting resin 4 in any conventional way. For example, the paper 2 may pass a container 5 with the resin 4. The paper 2 may also pass between rollers 6, pressing the resin 4 into the paper 2. The resin 4 is preferably pressed into the paper 2 from both sides of the paper 2. By thermosetting resin is also meant a composition comprising a thermosetting resin.

In one embodiment, wear resistant particles 7 are applied on an upper side of the resin impregnated paper 2. When later arranged on a substrate, this side will be facing downwards, towards the substrate. The wear resistant particles 7 are provided for obtaining wear resistant properties of the paper. The wear resistant particles 7 may be aluminium oxide ($Al_2O_3$), for example corundum. The wear resistant particles 7 may have an average particle size of 5-100 μm. The wear resistant particles 7 may be scattered on the upper side of the paper 2.

The resin-impregnated paper 2 is thereafter dried. Preferably, the paper 2 is guided into a first drying station 8. The paper 2 is preferably dried by means of heated air. The temperature in the first drying station 8 may be 100-150° C. As an example, the temperature may be about 100-110° C. at the entrance of the first drying station 8, and may be 140-150° C. at the end of the first drying station 8. It is also contemplated that the paper 2 may be dried by means of, for example, IR.

The paper is preferably dried to such an extent that the loss on cure of the paper after drying is less than 20%, preferably less than 15%. The loss on cure of the paper after drying may be 9-20%, such as 10-13%.

When the paper 2 has been impregnated with the thermosetting resin 4 and dried, a photocatalytic dispersion 10 is thereafter applied on the paper 2 in a subsequent step in an application station 9.

The photocatalytic dispersion 10 is applied by one or more rollers 11 onto the paper. The photocatalytic dispersion 10 may be filled into a container in which the paper 2 passes. The photocatalytic dispersion 10 may be circulated.

The photocatalytic dispersion 10 is applied on at least one side of the paper 2. The photocatalytic dispersion 10 may be applied on a side of the paper 2 facing downwards when passing the impregnation line 1. When later arranged on a substrate, this side will be facing upwards, forming an upper surface.

The photocatalytic dispersion 10 may be applied on the paper 2 in an amount of 10-50 $g/m^2$, more preferably 20-40 $g/m^2$ such as about 30 $g/m^2$ such as about 20 $g/m^2$. In one embodiment, the photocatalytic dispersion is applied in an amount of 1-10 $g/m^2$.

As an alternative or complement, the photocatalytic dispersion may be applied by any other means, such as by spraying, brushing, digital printing etc.

The photocatalytic dispersion 10 comprises photocatalytic nanoparticles. The photocatalytic nanoparticles may be photocatalytic titanium dioxide ($TiO_2$). The photocatalytic titanium dioxide particles are preferably in anatase form.

The photocatalytic composition may comprise photocatalytic $TiO_2$ particles in dispersion. The photocatalytic $TiO_2$ are preferably in anatase phase. The photocatalytic dispersion may be dispersed in a solvent, preferably water. The concentration of photocatalytic $TiO_2$ particles in the dispersion is preferably in the range 0.3 wt. % to 40 wt. %, more preferably in the range 1.0 wt. % to 30 wt. % such as in the range 5 wt. % to 25 wt. %. The photocatalytic $TiO_2$ particles are preferably applied on the paper 2 in an amount of 0.5-12.5 $g/m^2$, more preferably 1-10 $g/m^2$ such as less than 10 $g/m^2$ such as less than 5 $g/m^2$.

In an embodiment, the photocatalytic particles may be doped with non-metals and/or metals. The $TiO_2$ particles may be doped with non-metals and/or elements such as but not limited to the list of C, N, F, S, Mo, V, W, Cu, Ag, Au, Pt, Pd, Fe, Co, La, Eu, $WO_2$, and PdO or a combination thereof.

The photocatalytic particles may be nanosized $TiO_2$ particles. The $TiO_2$ particles may have a size in the range from 5-250 nm, preferably in the range 5-100 nm, more preferably in the range 5-50 nm, most preferably in the range of 5-30 nm.

The photocatalytic dispersion 10 may be stabilized by pH and/or a dispersant agent. The photocatalytic dispersion 10 may be stabilized at pH>9 by preferably, but not limited to, amines, for example triethylenamine. The photocatalytic dispersion may also be stabilized at pH<4 by preferably, but not limited to, a strong acid like HCl. The photocatalytic dispersion may further be stabilized by a dispersion agent to keep the particles in suspension and from re-agglomerating. The dispersion may be stabilized by, but not limited to, propylene glycol. In an embodiment, binders are added to the photocatalytic composition to enable and to improve the adhesion of the $TiO_2$ particles to the substrate on which the composition is applied. Preferably these binders are non-photocatalytically degradable in the group of preferably, but not limited to, silanes, siloxanes, silicones, $SiO_2$, surface modified $SiO_2$, amorphous $TiO_2$, alkoxides, Ti-alkoxides, Si-alkoxides, UV curable binders and heat curable binders.

In an embodiment, the photocatalytic composition 10 is a stable nanosized $TiO_2$ dispersion in water with a size in suspension of said photocatalytic particles of less than 50 nm in concentration of said $TiO_2$ particles up to 40 wt. %. Additives may be added to the photocatalytic composition in order to, for example, enhance the coating and film formation properties and to improve the colourfastness upon light exposure. Additives may be added to the photocatalytic composition as to improve the coating and/or application properties of the photocatalytic composition. Examples of such additives are humectants. Furthermore, wetting agents may be added to the photocatalytic composition to enhance the wetting of the photocatalytic composition on a substrate. An example of such wetting agent may be, but not limited to, the group of polyether modified siloxanes silicone surfactant such as polyether modified siloxanes.

The photocatalytic dispersion 10 may further comprise scratch resistant particles. The scratch resistant particles provide the paper with scratch resistant properties.

In one embodiment, the scratch resistant particles comprise nanosized silica particles. The silica particles may be fused nanosized silica particles. The silica particles may comprise a silicium containing compound such as $SiO_2$, colloidal $SiO_2$, functional nanoscaled $SiO_2$, silicone resin, organofunctional silanes, and/or colloidal silicic acid silane and/or a combination of said compounds.

The nanosized silica may have a primary particles size of less than 50 nm, preferably less than 30 nm, more preferably less than 20 nm. As an example, the nanosized silica may be of the type DeuroGuard NS marked by Deurowood.

The ratio between the amount of photocatalytic nanoparticles such as $TiO_2$ and the amount of nanosized silica may be 1:4, such as 1:3, such as 1:2 such as 1:1.

In other embodiments, the scratch resistant particles comprise aluminium oxide ($Al_2O_3$), zirconia ($ZrO_2$), or a combination comprising silica, aluminium oxide, and/or zirconia.

In one embodiment, the scratch resistant particles may comprise disc shaped particles. The disc shaped particles may have an average particle size of 1-100 μm, for example 1-30 μm. The width/thickness ratio may equal or be exceeding 3:1, preferably equal or exceeding 5:1.

The disc shaped scratch resistant particles may be or comprise aluminium oxide ($Al_2O_3$). As an example, the scratch resistant particles may be of the type Microgrit WCA "S" marketed by Micro Abrasives Corporation.

In one embodiment, the photocatalytic dispersion 10 comprises different types of scratch resistant particles, such as both nanosized silica and disc-shaped particles.

The photocatalytic dispersion may further comprise an anti-photogreying additive. The anti-photogreying additive may be a surfactant. The surfactant may be a non-ionic surfactant. The surfactant may be a silicone surfactant, preferably a non-ionic silicone surfactant. More preferably, the surfactant may be a polyether modified siloxanes. More preferably, the surfactant may be a polyether modified polysiloxanes. More preferably, the surfactant may be a polyether modified polymethyl siloxane. As an alternative, the surfactant may be polydimethylsiloxane co-polymer.

In a further embodiment, the anti-photogreying additive may be a polyglycol, preferably poly(ethylene glycol) methyl ether.

In a further embodiment, the anti-photogreying additive may be a polyoxyethylene sorbitan, preferably polyoxyethylene sorbitan. Preferably, the anti-photogreying additive may be a polyoxyethylene sorbitan monooleate.

In a further embodiment, the anti-photogreying additive may be polyvinyl alcohol (PVA) and/or polyvinyl pyrolidon (PVP), and/or poly(ethylene glycol) methyl ether, preferably combined with a wetting agent.

The photocatalytic dispersion may comprise at least 0.1 wt. % of the anti-photogreying additive such as the surfactant, preferably at least 1 wt. % of the anti-photogreying additive such as the surfactant, more preferably at least 10 wt. % of the anti-photogreying additive such as the surfactant. The anti-photogreying additive such as the surfactant may be present in the photocatalytic dispersion in the range of 1-35 wt. %, preferably 1-15 wt. %, more preferably 5-12 wt. %.

The anti-photogreying additive such as the surfactant may reduce photogreying while maintaining the photocatalytic activity of the photocatalytic nanoparticles. The photocatalytic activity is preferably maintained to a level of at least 90% of the level achieved without the photogreying additive. The photogreying index of the photocatalytic dispersion may be less than 6, preferably less than 5, more preferably less than 4, most preferably less than 3 such as less than 2.

After the paper 2 has been coated with the photocatalytic dispersion 10, the paper is dried. Preferably, the paper 2 is preferably guided into a second drying station 12. The paper 2 is preferably dried by means of heated air. The temperature in the second drying station 12 may be 120-100° C. As an example, the temperature may be about 120° C. at the entrance of the second drying station 12, and may be about 110° C. at the end of the second drying station 12. It is also contemplated that the paper may be dried by means of, for example, IR.

The dried paper 2 may be cut into sheets, or may be wound, for example on a roller, as shown in FIG. 2, depending on the subsequent process.

The impregnated paper 2 may be stored after impregnation, or may directly be used in a lamination process.

The impregnated paper 2 may be an overlay paper 21. The impregnated paper may be a décor paper. If the impregnated paper 2 is a décor paper, the décor paper is arranged such that the décor faces downwards in the impregnation line and such that the photocatalytic dispersion 10 is applied on the décor.

Figure 3A:
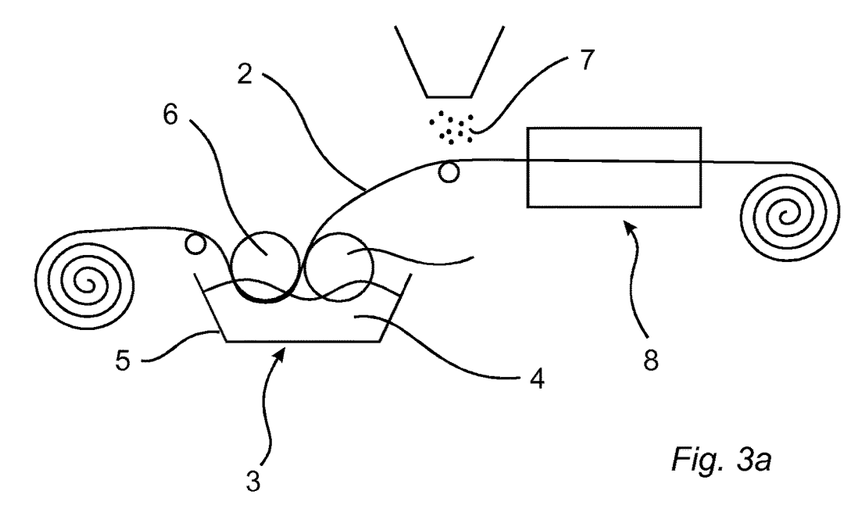
FIGS. 3a-b show an embodiment of a method of applying a photocatalytic dispersion.
Figure 3B:
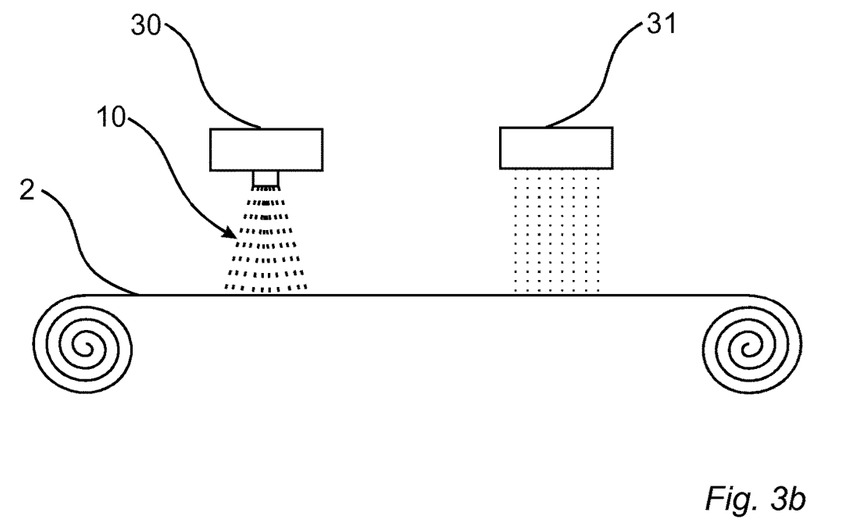

In one embodiment, which is shown in FIGS. 3a-b, the paper is first impregnated in an impregnation process, which is shown in FIG. 3a, and thereafter the photocatalytic dispersion 10 is applied, which is shown in FIG. 3b.

In a first step, corresponding to the first part of the impregnation line shown in FIG. 2, the paper 2 is impregnated with a thermosetting resin 4 in an impregnation station 3, which is shown in FIG. 3a. The thermosetting resin 4 is preferably an amino resin such as melamine formaldehyde resin, phenol formaldehyde resin, urea formaldehyde resin, or a combination thereof. Preferably, the resin is melamine formaldehyde resin.

The paper 2 is impregnated with the thermosetting resin 4 in any conventional way. For example, the paper 2 may pass a container 5 with the resin 4. The paper 2 may also pass between rollers 6, pressing the resin 4 into the paper 2. The resin 4 is preferably pressed into the paper 2 from both sides of the paper 2. By thermosetting resin is also meant a composition comprising a thermosetting resin.

In one embodiment, wear resistant particles 7 are applied on an upper side of the resin impregnated paper 2. When later arranged on a substrate, this side will be facing downwards, towards the substrate. The wear resistant particles 7 are provided for obtaining wear resistant properties of the paper. The wear resistant particles 7 may be aluminium oxide ($Al_2O_3$), for example corundum. The wear resistant particles 7 may have an average particle size of 5-100 μm. The wear resistant particles 7 may be scattered on the upper side of the paper 2.

The resin-impregnated paper 2 is thereafter dried. Preferably, the paper 2 is guided into a first drying station 8. The paper 2 is preferably dried by means of heated air. The temperature in the first drying station 8 may be 100-150° C. As an example, the temperature may be about 100-110° C. at the entrance of the first drying station 8, and may be 140-150° C. at the end of the first drying station 8. It is also contemplated that the paper 2 may be dried by means of for example IR.

The paper is preferably dried to such an extent that the loss on cure of the paper after drying is less than 10%. The loss on cure of the paper after drying may be 5-9%.

The dried, resin impregnated paper 2 is thereafter wound on a roller as shown in FIG. 3a, or cut into sheets (not shown).

In a second step, which may be separate and/or offline from the impregnation process described with reference to FIG. 3a, the photocatalytic dispersion 10 is applied to the dried, resin impregnated paper 2, which is shown in FIG. 3b.

The photocatalytic dispersion 10 is applied to the dried, resin impregnated paper 2. The photocatalytic dispersion 10 is of the same type as described above with reference to FIG. 2. The paper 2 may be in form of a continuous paper web as shown in FIG. 3b, or have been cut into sheet (not shown).

Independent of the paper 2 being a continuous web or cut into sheets, the photocatalytic dispersion 10 is applied on the dried, resin impregnated paper 2. The photocatalytic dispersion 10 is of the type described above with reference to FIG. 2. The photocatalytic dispersion 10 may comprises an anti-photogreying additive of the type described above with reference to FIG. 2, scratch and/or wear resistant particles of the type described above with reference to FIG. 2, and additives of the type described above with reference to FIG. 2. The photocatalytic dispersion 10 is preferably applied by means of spraying. FIG. 3b shows spraying of the photocatalytic dispersion 10 by a spraying device 30. The size of the droplets may be in the range of 1-200 μm, and may be up to about 200 μm, 150 μm, 100 μm, 50 μm, 25 μm or 10 μm. The photocatalytic dispersion 10 may be applied on the paper 2 in an amount of 10-50 g/m$^2$, more preferably 20-40 g/m$^2$ such as about 30 g/m$^2$ such as about 20 g/m$^2$. In one embodiment, the photocatalytic dispersion is applied in an amount of 1-10 g/m$^2$. The concentration of photocatalytic TiO$_2$ particles in the dispersion is preferably in the range 0.3 wt. % to 40 wt. %, more preferably in the range 1.0 wt. % to 30 wt. % such as in the range 5 wt. % to 25 wt. %. The photocatalytic TiO$_2$ particles are preferably applied on the paper 2 in an amount of 0.5-12.5 g/m$^2$, more preferably 1-10 g/m$^2$ such as less than 10 g/m$^2$ such as less than 5 g/m$^2$.

Alternatively, or as complement, the photocatalytic dispersion is applied by roller coating, brushing, digital printing, etc.

The paper 2 having the photocatalytic dispersion applied thereon is thereafter dried, preferably by a drying device 31. Preferably, the paper 2 is dried by means of IR or NIR. It is also contemplated that the paper may be dried by means of for example heated air, for example as described with reference to FIG. 2.

The dried paper 2 may be cut into sheets, or may be wound, for example on a roller, as shown in FIG. 3b, depending on the subsequent process.

The impregnated paper 2 may be stored after impregnation, or may directly be used in a lamination process.

Figure 4:
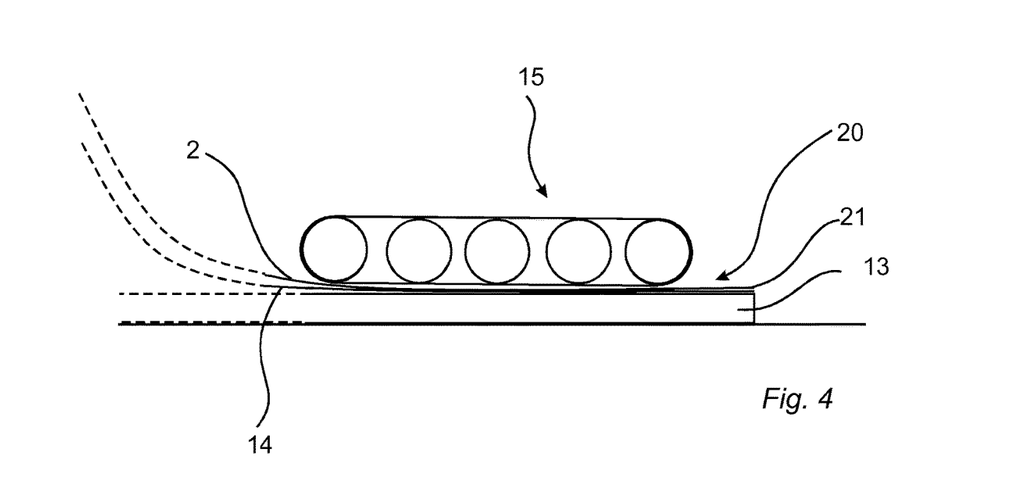
FIG. 4 shows an embodiment of a method of manufacturing a panel.

The impregnated paper 2 may be an overlay paper 21. The impregnated paper may be a décor paper. If the impregnated paper 2 is a décor paper, the décor paper is arranged such that the décor faces downwards in the impregnation line and such that the photocatalytic dispersion 10 is applied on the décor. The impregnated paper 2 having the photocatalytic dispersion applied thereon may be arranged on a substrate 13. The substrate 13 may be wood based substrate such as HDF, MDF, particle board, OSB, WPC (wood plastic composite). The impregnated paper 2, such an overlay paper 21, may also be arranged on a décor paper 14 arranged on the substrate 13, as shown in FIG. 4.

The impregnated paper 2 is arranged on the substrate 13 or on the underlying décor paper 14 such that the side of the paper on which the photocatalytic dispersion 10 is applied is facing upwards away from the substrate 13 or underlying paper 14. If wear resistant particles 7 have been applied on the other side of the paper, this side of the paper is facing the substrate 13 or the underlying décor paper 14.

Figure 5:
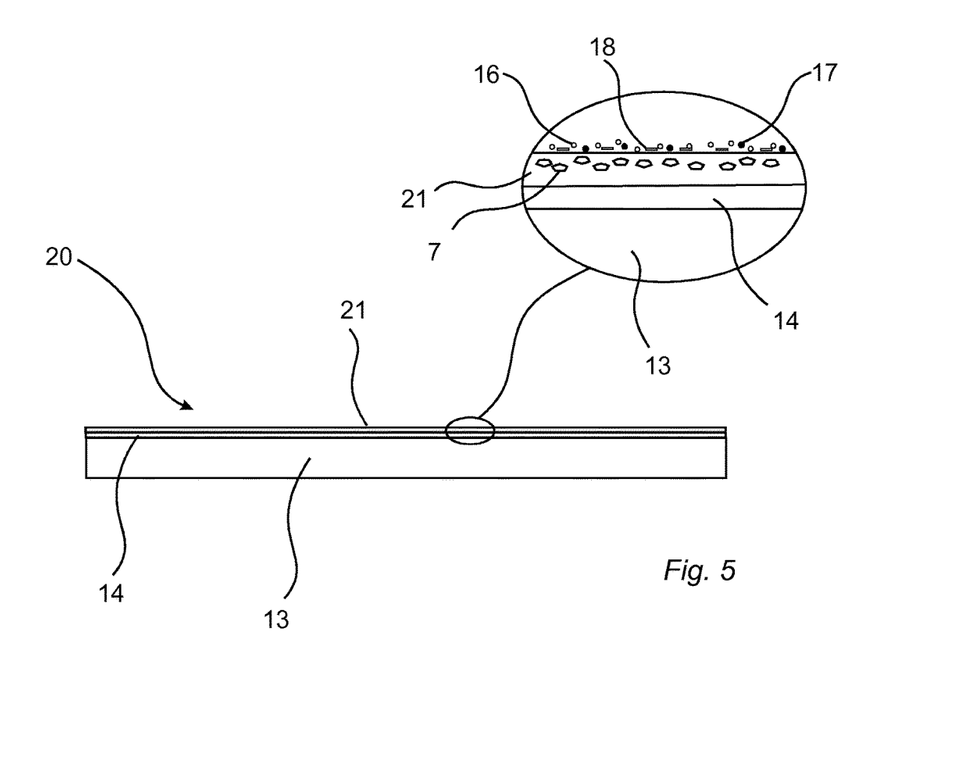
FIG. 5 shows a panel having a photocatalytic dispersion applied thereon.

By applying heat and pressure, the thermosetting resin of the impregnated paper 2 is cured and the impregnated paper 2 is laminated to the substrate 13 or underlying paper 14. In FIG. 4, the substrate 13, the décor paper 14 and the impregnated paper 2 forming the overlay paper 21 is conveyed through a continuous press 15, wherein the substrate 13, décor paper 14 and the overlay paper 2 are attached to each other. Thereby, a panel 20 comprising a photocatalytic surface having scratch resistant properties is obtained, as shown in FIG. 5. As an alternative to a continuous press, a static press may also be used.

The photonic efficiency of the paper 2 having photocatalytic properties may be exceeding 0.025%, preferably exceeding 0.05%, more preferably exceeding 0.1%. The paper 2, 21 on which the photocatalytic dispersion has been applied obtains hydrophilic properties. The contact angle with water may be less than 40° under indoor lightning conditions, preferably less than 30°, more preferably less than 25° such less than 20°.

As shown in FIG. 5, the panel 20 comprising a substrate 13 of the above described type, a décor paper 14 arranged on the substrate and the impregnated paper 2 forming the overlay paper 21, impregnated and applied with a photocatalytic dispersion 10 according the above described method.

The overlay paper 21 comprises in the embodiment shown in FIG. 5 wear resistant particles 7 on the side of the overlay paper 21 facing downwards, i.e. facing the décor paper 14. The wear resistant particles 7 may have an irregular shape. The overlay paper 21 further comprises photocatalytic nanoparticles 16 on the side of the overlay paper 21 facing upwards, i.e. facing away from the décor paper 14. The overlay paper 21 further comprises scratch resistant particles. The scratch resistant particles may be nanosized silica 17. The scratch resistant particles may also be disc-shaped particles 18 of for example aluminium oxide. The disc-shaped particles 18 are orientated such along the surface of the overlay paper 21.

Figure 6:
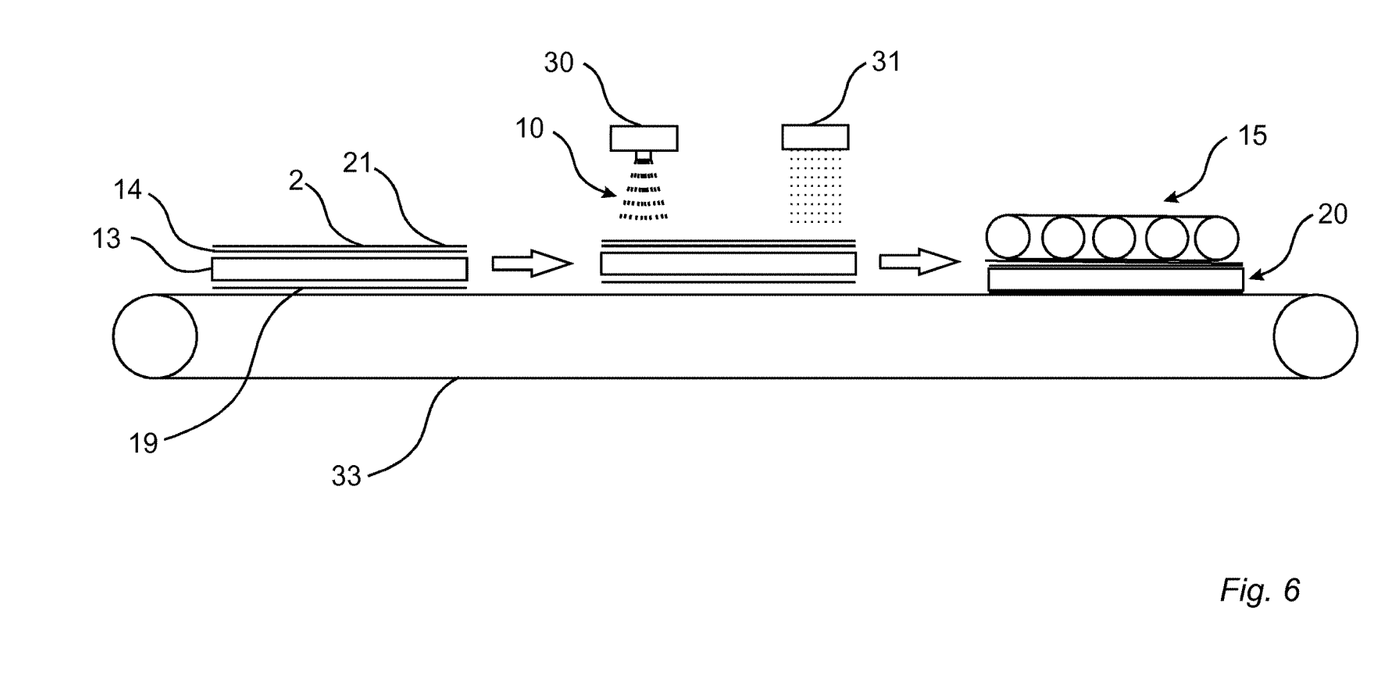
FIG. 6 shows an embodiment of a method of manufacturing a panel.

In one embodiment, the photocatalytic dispersion is applied in connection with manufacturing a panel 20, which is shown in FIG. 6.

A balancing layer 19 is arranged on a conveyor belt 33. The balancing layer 19 may be a backing paper. The backing paper is preferably a resin impregnated paper. A substrate 13 is arranged on the balancing layer. The substrate 13 may be a wood-based board such as MDF, HDF, particle board, OSB, WPC (Wood Plastic Composite), etc. The substrate 13 may be formed of several resin impregnated papers. As an alternative to a backing paper, the substrate 13 may be provided with a powder based balancing layer on one side of the substrate 13. The powder based balancing layer may comprise a thermosetting binder and lignocellulosic and/or cellulosic particles.

A decorative layer 14 may be arranged on a surface of the substrate 13 opposite the balancing layer 19. The decorative layer 14 may be a printed paper or foil of any type as shown in FIG. 6. The decorative layer 14 may also be formed of a print printed on the substrate 13.

An overlying layer 21 is arranged on the decorative layer 14, as shown in FIG. 6. The overlying layer 21 may also be arranged on the substrate if no separate decorative layer is provided. The overlying layer 21, on which the photocatalytic dispersion is to be applied, forms an outermost surface layer of the panel 20.

The overlying layer 21 is in the embodiment shown in FIG. 6 provided in form of a dried, resin impregnated paper 2. The impregnated paper 2 may be an overlay paper. The overlay paper may comprise wear and/or scratch resistant particles of the above described type. The overlay paper is impregnated with a thermosetting binder. The thermosetting resin is preferably an amino resin such as melamine formaldehyde resin, phenol formaldehyde resin, urea formaldehyde resin, or a combination thereof.
Preferably, the resin is melamine formaldehyde resin. The paper is preferably dried to such an extent that the loss on cure of the paper is less than 10%. The loss on cure of the paper may be 5-9%. The paper has been impregnated and dried is a separate process from the process of forming the panel.
The photocatalytic dispersion 10 is applied on the overlying layer 21. The photocatalytic dispersion 10 is of the type described above with reference to FIG. 2. The photocatalytic dispersion 10 may comprises an anti-photogreying additive of the type described above with reference to FIG. 2, scratch and/or wear resistant particles of the type described above with reference to FIG. 2, and additives of the type described above with reference to FIG. 2. The photocatalytic dispersion is preferably applied by means of spraying. In FIG. 6, the photocatalytic dispersion 10 is applied by a spraying device 30. The size of the droplets may be up to about 200 µm, 150 µm, 100 µm, 50 µm, 25 µm or 10 µm. The photocatalytic dispersion 10 may be applied on the paper 2 in an amount of 10-50 $g/m^2$, more preferably 20-40 $g/m^2$ such as about 30 $g/m^2$ such as about 20 $g/m^2$. In one embodiment, the photocatalytic dispersion is applied in an amount of 1-10 $g/m^2$. The concentration of photocatalytic $TiO_2$ particles in the dispersion is preferably in the range 0.3 wt. % to 40 wt. %, more preferably in the range 1.0 wt. % to 30 wt. % such as in the range 5 wt. % to 25 wt. %. The photocatalytic $TiO_2$ particles are preferably applied on the paper 2 in an amount of 0.5-12.5 $g/m^2$, more preferably 1-10 $g/m^2$ such as less than 10 $g/m^2$ such as less than 5 $g/m^2$.

Alternatively, or as complement, the photocatalytic dispersion 10 is applied by roller coating, brushing, digital printing, etc.

The paper 2 having the photocatalytic dispersion applied thereon is thereafter dried by means of a drying device 31. Preferably, the paper 2 is dried by means of IR or NIR. It is also contemplated that the paper may be dried by means of for example heated air, for example as described with reference to FIG. 2.

As an alternative, the photocatalytic dispersion 10 may be applied before the dried, resin impregnated paper 2 is arranged on the substrate 13.

The layers are thereafter pressed together to form a panel 20 by applying heat and pressure. Thereby, a panel 20 having outermost layer 21 having photocatalytic properties is obtained. The photonic efficiency of the outermost layer 21 such as an overlay paper having photocatalytic properties may be exceeding 0.025%, preferably exceeding 0.05%, more preferably exceeding 0.1%. The paper 2, 21 on which the photocatalytic dispersion has been applied obtains hydrophilic properties. The contact angle with water may be less than 40° under indoor lightning conditions, preferably less than 30°, more preferably less than 25° such less than 20°.

In the embodiment disclosed in FIG. 6, the different layers are provided as sheets. However, the different layers may as an alternative be provided as continuous webs of material. For example, the dried, resin impregnated paper may be provided in form of sheets, which may be stacked, as shown in FIG. 6. Alternatively, the dried, resin impregnated paper may be provided as a continuous web (not shown). It is contemplated that there are numerous modifications of the embodiments described herein, which are still within the scope of the disclosure as defined by the appended claims.

It is for example contemplated that the photocatalytic dispersion is applied in more than one step. The photocatalytic dispersion may be applied twice, or more, to the dried, resin impregnated paper. The photocatalytic dispersion may comprise different scratch resistant particles in the different application steps.

It is also contemplated that embodiments of the method may be used to impregnate and apply a photocatalytic dispersion on any other types of sheets and substrates than a paper, such as a web of glass fibres or a non-woven, or a sheet of any other type.

EXAMPLES

Example 1

A melamine formaldehyde resin impregnated AC 3 overlay paper was coated with a 1:1 formulation containing appr. 30 wt. % nanosized photocatalytic anatase $TiO_2$ and appr. 30 wt. % nano silica formulation. The composition was applied on the AC3 overlay paper with a wire rod and ambient dried. The melamine impregnated and $TiO_2$ and $SiO_2$ coated overlay paper was pressed together with a décor, a core and backing paper to a laminate structure. The pressed laminate was visually checked for photogreying after UV exposure and the photocatalytic activity was tested regarding the degradation of ethanol.

Example 2

A melamine formaldehyde resin impregnated AC 3 overlay paper was coated with a 1:1 formulation containing appr. 30 wt. % nanosized photocatalytic anatase $TiO_2$ composition containing 9 wt. % polyether modified polysiloxanes as anti-photogreying agent and appr. 30 wt. % nano silica formulation. The composition was applied on the AC3 overlay paper with a wire rod and ambient dried. The melamine impregnated and $TiO_2$ and $SiO_2$ coated overlay paper was pressed together with a décor, a core and backing paper to a laminate structure. The pressed laminate was visually checked for photogreying after UV exposure and the photocatalytic activity was tested regarding the degradation of ethanol.

The ethanol test is performed by monitoring the $CO_2$ release from the photocatalytic degradation of ethanol under UVA irradiation. The $CO_2$ is measured with a $CO_2$ detector mounted in an air tight box of approximately 6 L. The sample and 50 µL 10% EtOH solution is added to the box. The activity of the tested sample is expressed as the release of $CO_2$ per hour per area of tested sample. The release of $CO_2$ is expressed as the slope of the logged $CO_2$ graph.

|  | Photogreying | Photocatalytic Activity |
|---|---|---|
| Example 1 | Yes | — |
| Example 2 | No | 1546 ppm/hr/m$^2$ |

Example 3

A melamine formaldehyde resin impregnated AC 3 overlay paper was coated with a 1:1 formulation containing appr. 30 wt. % nanosized photocatalytic anatase TiO$_2$ composition containing 9 wt. % polyether modified polysiloxanes as anti-photogreying agent and appr. 30 wt. % nano silica formulation. The composition was applied on the AC3 overlay paper with a RDS4 wire rod yielding approximately 30 g of wet formulation per m2 of overlay paper. The coated overlay paper was ambient dried. The melamine impregnated and TiO$_2$ and SiO$_2$ coated overlay paper was pressed together with a décor, a core and backing paper to a laminate structure. The pressed laminate was visually checked for Photogreying after UV exposure and the photocatalytic activity was tested regarding the degradation of ethanol as in example 1.

|  | Photogreying | Photocatalytic Activity |
|---|---|---|
| Example 3 | No | 5198 ppm/hr/m$^2$ |

The invention claimed is:

1. Method of applying a photocatalytic dispersion on a paper, the method comprising
impregnating a paper with a thermosetting resin,
drying the resin impregnated paper,
applying a photocatalytic dispersion comprising photocatalytic nanoparticles on the dried, resin impregnated paper, and
drying the resin impregnated paper having the photocatalytic dispersion applied thereon,
wherein the photocatalytic dispersion further comprises scratch resistant particles.

2. Method according to claim 1, wherein the photocatalytic dispersion further comprises an anti-photogreying additive.

3. Method according to claim 2, wherein the anti-photogreying additive is a surfactant.

4. Method according to claim 3, wherein the surfactant is a polyether modified siloxanes.

5. Method according to claim 2, wherein the anti-photogreying additive is present in the photocatalytic dispersion in a concentration higher than 0.1 wt. %.

6. Method according to claim 2, wherein the anti-photogreying additive is present in the photocatalytic dispersion in a range of 1-35 wt. %.

7. Method according to claim 1, wherein the scratch resistant particles are nanosized silica particles.

8. Method according to claim 7, wherein the scratch resistant particles are or comprise aluminium oxide.

9. Method according to claim 1, wherein the scratch resistant particles are disc shaped particles having a width/thickness ratio being equal or exceeding 3:1.

10. Method according to claim 1, wherein the photocatalytic nanoparticles are photocatalytic titanium dioxide.

11. Method according to claim 1, wherein photocatalytic nanoparticles have primary particle size of less than 50 nm.

12. Method according to claim 1, wherein the photocatalytic dispersion is waterborne.

13. Method according to claim 1, wherein the photocatalytic dispersion is applied by at least one roller.

14. Method according to claim 1, wherein the paper is a continuous paper web.

15. The method according to claim 1, wherein a loss on cure of the resin impregnated paper after the drying is less than 20%.

16. A method of applying a photocatalytic dispersion on a paper, the method comprising:
impregnating a paper with a thermosetting resin,
drying the resin impregnated paper,
applying a photocatalytic dispersion comprising photocatalytic nanoparticles and scratch resistant particles on the dried, resin impregnated paper, and
drying the resin impregnated paper having the photocatalytic dispersion applied thereon,
wherein a ratio of the amount of photocatalytic nanoparticles to the amount of scratch resistant particles is between 1:4 and 1:1.

17. A method of applying a photocatalytic dispersion on a paper, the method comprising:
impregnating a paper with a thermosetting resin,
drying the resin impregnated paper,
applying a photocatalytic dispersion on the dried, resin impregnated paper, the photocatalytic dispersion comprising photocatalytic nanoparticles, scratch resistant particles, and an anti-photogreying additive, and
drying the resin impregnated paper having the photocatalytic dispersion applied thereon.

* * * * *